United States Patent [19]

Enami

[11] Patent Number: 5,659,760

[45] Date of Patent: Aug. 19, 1997

[54] MICROPROCESSOR HAVING INTERRUPT VECTOR GENERATION UNIT AND VECTOR FETCHING COMMAND UNIT TO INITIATE INTERRUPT PROCESSING PRIOR TO RETURNING INTERRUPT ACKNOWLEDGE INFORMATION

[75] Inventor: Tomokazu Enami, Tokyo, Japan

[73] Assignee: NEC Corporation, Tokyo, Japan

[21] Appl. No.: 19,274

[22] Filed: Feb. 18, 1993

[30] Foreign Application Priority Data

Feb. 18, 1992 [JP] Japan ................................. 4-029814

[51] Int. Cl.⁶ ........................................................ C06F 9/66
[52] U.S. Cl. .......................... 395/742; 395/869; 395/870
[58] Field of Search .................................. 395/275, 725, 395/800, 733, 735, 734, 739, 742, 775, 868, 869, 870; 364/200, 900

[56] References Cited

U.S. PATENT DOCUMENTS

| | | | |
|---|---|---|---|
| 4,200,912 | 4/1980 | Harrington et al. | 364/200 |
| 4,315,314 | 2/1982 | Russo | 364/200 |
| 4,349,573 | 9/1982 | Gunter et al. | 364/200 |
| 4,349,872 | 9/1982 | Fukasawa et al. | 364/200 |
| 4,523,277 | 6/1985 | Schnatharst | 364/200 |
| 4,646,260 | 2/1987 | Chasse et al. | 364/900 |
| 4,987,535 | 1/1991 | Takayama | 395/742 |
| 5,133,056 | 7/1992 | Miyamori | 395/275 |

*Primary Examiner*—Thomas C. Lee
*Assistant Examiner*—D. Dinh
*Attorney, Agent, or Firm*—Foley & Lardner

[57] ABSTRACT

A microprocessor for performing an interrupt operation receives an interrupt-enable signal representative of occurrence of at least interrupt request and interrupt level information representative of a selected one of interrupt sources issuing the interrupt request and includes an interrupt receiving unit activated by the interrupt-enable signal for producing vector fetching command information when an interrupt operation responsive to the interrupt level information is acceptable, an interrupt vector generation unit activated by the interrupt-enable signal for generating interrupt vector information, and an execution unit fetching the interrupt vector information in response to the vector fetching command information, the execution unit thereby initiates an interrupt operation by use of the interrupt vector information and returning interrupt acknowledge information as a part of the interrupt operation.

8 Claims, 5 Drawing Sheets

MICROPROCESSOR HAVING INTERRUPT VECTOR GENERATION UNIT AND VECTOR FETCHING COMMAND UNIT TO INITIATE INTERRUPT PROCESSING PRIOR TO RETURNING INTERRUPT ACKNOWLEDGE INFORMATION

BACKGROUND OF THE INVENTION

The present invention relates to a microprocessor and, more particularly, to an improvement in an interrupt vector generation unit in a microprocessor for generating an interrupt vector in response to an interrupt request.

As is well known in the art, in order for a microprocessor or central processing unit (CPU) to perform an operation requested by a peripheral unit operating in asynchronism with the CPU, the CPU handles such an operation as an interrupt operation. Specifically, the peripheral unit, when requesting a data processing operation from the CPU, supplies an interrupt request signal to the CPU. In response thereto, the CPU suspends the execution of a current program and then initiates an interrupt program routine corresponding to the requested data processing operation.

There are provided a plurality of peripheral units in general. The CPU is therefore required to distinguish which peripheral unit has issued an interrupt request. For this purpose, a plurality of interrupt vectors are provided correspondingly to the peripheral units. When one of the peripheral units issues an interrupt request, the interrupt vector associated thereto is generated and supplied to the CPU. The CPU thus distinguishes the interrupt program routine to be initiated by the associated interrupt vector.

There are two types of techniques for generating the interrupt vector, the first one of which is to generate the interrupt vector outside of the CPU and the second one of which is to generate it inside of the CPU.

Referring to FIG. 1, there is shown a microprocessor system of the first type. A CPU 1 is interconnected to an interrupt controller 3 via address and data buses 6 and 7. The controller includes an interrupt request control unit 31 supplied with interrupt request signals IQR-1 to IQR-m from peripheral units 10-1 to 10-m. When one or more peripheral units 10 issue the interrupt request, i.e., when one or more interrupt request signals IQR is changed to an active level, the interrupt request control unit 31 selects one of the active interrupt signals IRQ in accordance with the priority levels of the interrupt requests and then produces interrupt level information INTL representative of the selected interrupt request. The interrupt level information INTL is supplied to an interrupt vector generation unit 32 which, in response thereto, generates an interrupt vector IV corresponding to an interrupt operation of the selected peripheral unit 10. The interrupt vector IV is supplied to an output controller unit 34 which in turn outputs it on the data bus 7 when an enable signal supplied thereto takes an active level.

The interrupt level information INTL is further supplied to an interrupt receiving unit 11 of the CPU 1 through a level hold unit 33. The interrupt receiving unit 11 accepts the interrupt request indicated by level IV only when a mask bit of a status register (not shown) corresponding to the supplied interrupt level stores non-mask information and an execution unit 13 is performing a program operation whose level is lower than the supplied interrupt level. The interrupt receiving unit 11 produces interrupt status information AST representing whether or not the supplied interrupt request is accepted and further transfers, when accepting the interrupt request, the interrupt level IV onto the address bus 6. In the case of accepting the interrupt request, the CPU 1 initiates a bus cycle for fetching the interrupt vector.

The interrupt status information AST is decoded by a decoder 4. When the status information AST represents the acceptance of the interrupt request, the decoder 4 changes its output to an active level to activate a decoder 5. The decoder 5 thereby decodes the interrupt level INTL supplied via the address bus 6 and then changes one of interrupt acknowledge signals IACK connected respectively to the peripheral units 10 to an active level to inform the acceptance of the interrupt request. The ORed output of the acknowledge signals IACK is supplied to the output control unit 34 to allow it to output the interrupt vector IV onto the data bus 7. The CPU-1, which is in the interrupt vector fetch bus cycle, thus fetches and supplies the interrupt vector IV to an execution unit 13 through a vector input unit 14. An interrupt program operation is thus initiated.

Referring to FIG. 2, there is shown another microprocessor system of the second type in which the same constituents as those shown in FIG. 1 are denoted by the same reference numerals to omit the further description thereof. In this system, an interrupt vector generation unit is incorporated in the CPU 1. In order to synchronize the generation between the interrupt vector IV and the interrupt acknowledge signal IACK, there is provided a vector control unit 9 which is activated by the active level of at least one of the interrupt request signals IQR and produces an active level vector-enable signal AV in synchronism with the ORed acknowledge signal. The vector generation unit 12 is thereby activated to give the execution unit 13 the interrupt vector IV.

Since the CPU 1 has the interrupt vector generation unit 12, the interrupt vector fetch cycle is not required, which would be otherwise required in the system of FIG. 2. The firmware of CPU 1 of FIG. 2 is therefore simplified compared to that of FIG. 1.

Although two types of the microprocessor systems according to the prior art are described above, each of them is based on a technical concept that the execution unit 13 receives the interrupt vector IV simultaneously with the interrupt acknowledge signal IACK being returned to the peripheral unit 10. For this reason, the initiation of the interrupt program operation is delayed. Moreover, hardware such as the decoders 4 and 5 for producing the active level interrupt acknowledge signal is required and the interrupt receiving control unit 11 is required to produce the interrupt status information AST and transfer the interrupt level INTL.

SUMMARY OF THE INVENTION

It is therefore an object of the present invention is to provide a microprocessor which initiates an interrupt program operation with a minimum time delay in response to an interrupt request from a peripheral unit.

It is another object of the present invention is to provide a microprocessor which decreases hardware necessary for an interrupt operation.

A microprocessor according to the present invention is coupled to a plurality of peripheral units through a system bus and comprises a first terminal supplied an interrupt-enable signal which takes an active level when at least one of the peripheral units issues an interrupt request, a set of second terminals supplied with interrupt level information representative of one of the peripheral units issuing the interrupt request, an interrupt vector generation unit coupled to the first and second terminals, the generation unit being activated by the active level of the interrupt-enable signal and generating interrupt vector information in response to the interrupt level information, an interrupt receiving unit coupled to the first and second terminals, the receiving unit being activated by the interrupt-enable signal to detect whether or not an interrupt operation is to be initiated in response to the interrupt level information and producing, when the interrupt operation is detected to be initiated, vector fetching command information, and an execution unit coupled to the interrupt vector generation unit and the interrupt receiving unit and fetching the interrupt vector information in response to the vector fetching command information to initiate an interrupt program operation designated by the interrupt vector information, the execution unit returning an interrupt acknowledge to the peripheral unit by executing the interrupt program operation.

The present invention is thus based on a technical concept that the operation for returning the acknowledge to the peripheral unit can be performed as one of operations for the interrupt request. Accordingly, the generation of the interrupt vector is carried out immediately in response to the issue of the interrupt request and the execution unit receives the interrupt vector thus generated without waiting the interrupt acknowledge. The initiation of the interrupt program operation is made fast accordingly. Moreover, no hardware is required to generate and return the interrupt acknowledge signal to the peripheral unit.

BRIEF DESCRIPTION OF THE DRAWINGS

The above and other objects, advantages and features of the present invention will be more apparent from the following description taken in conjunction with the drawings, in which.

DETAILED DESCRIPTION OF THE INVENTION

Figure 1:
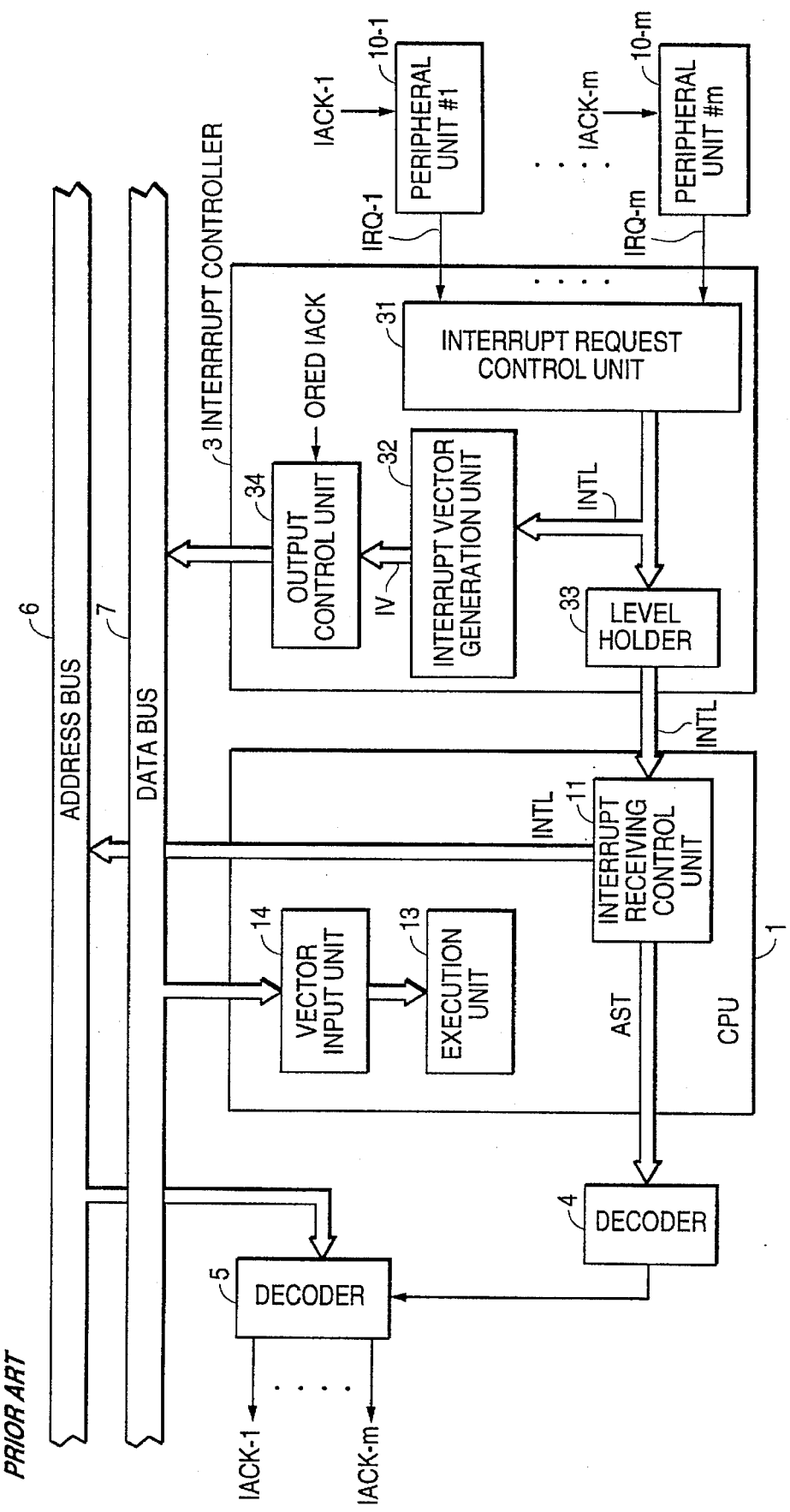
FIG. 1 is a block diagram representative of a microprocessor system according to prior art.
Figure 2:
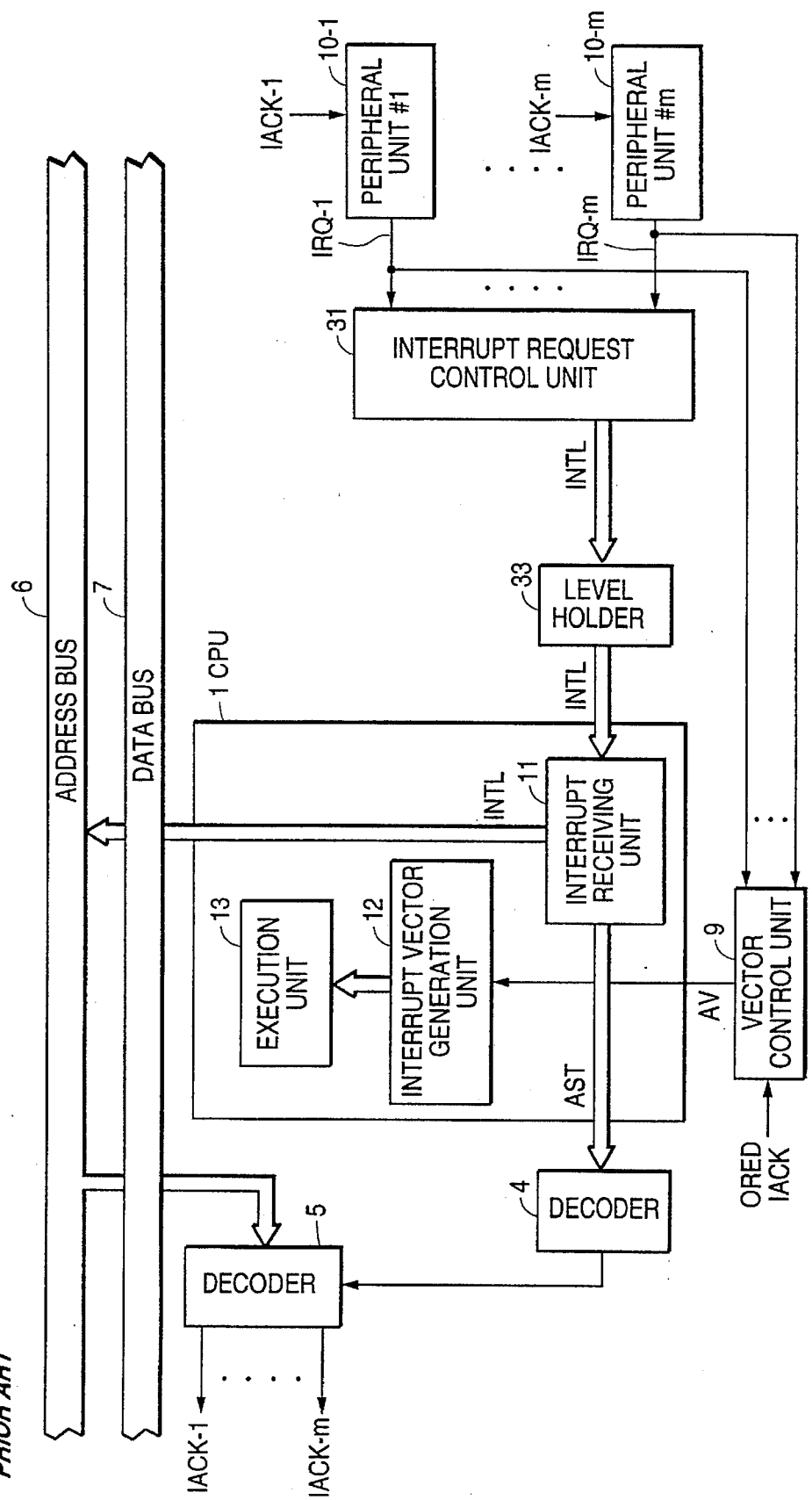
FIG. 2 is a block diagram representative of microprocessor system according to another prior art.
Figure 3:
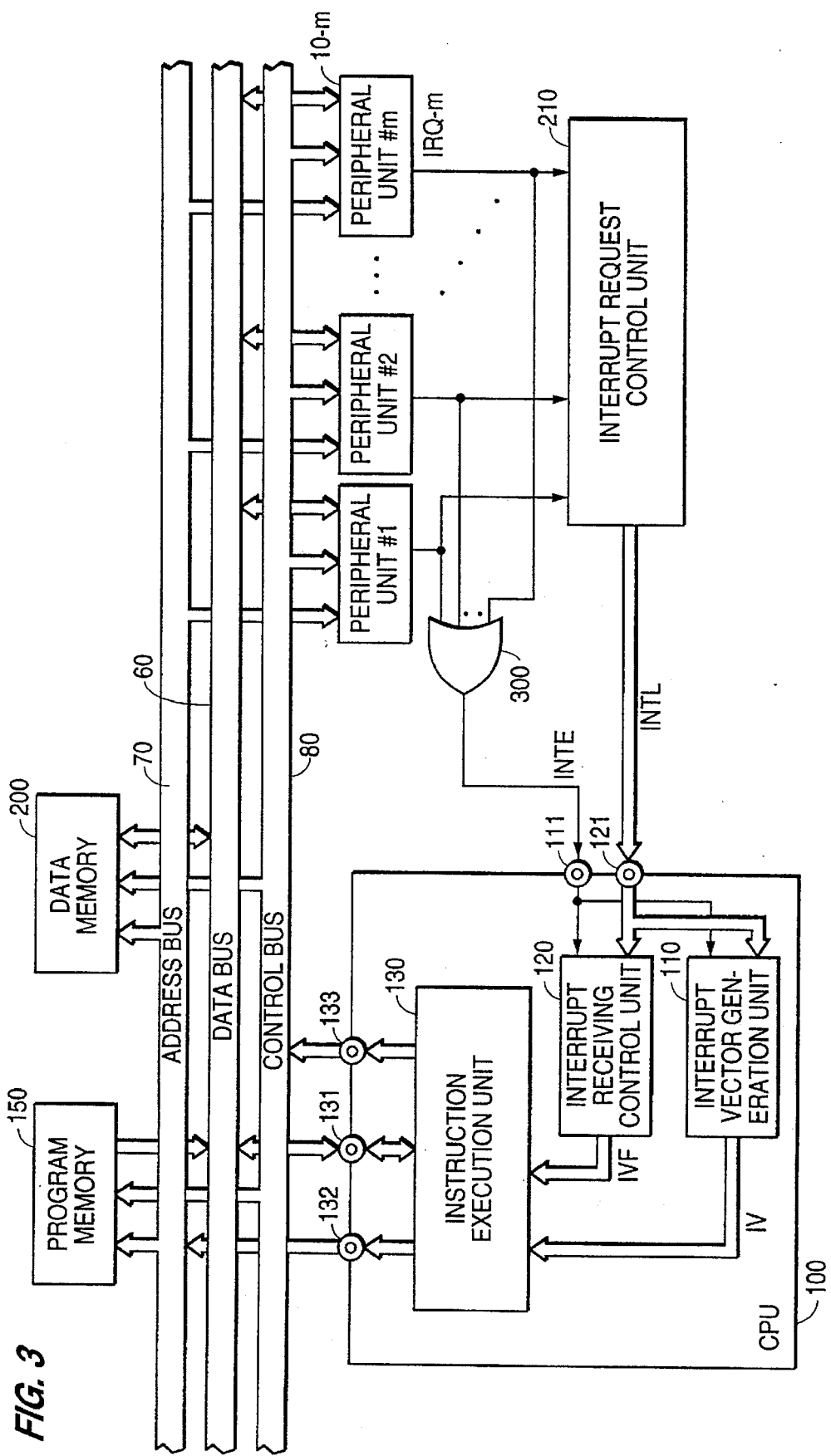
FIG. 3 is a block diagram representative of a microprocessor system employing a microprocessor according to an embodiment of the present invention.

Referring to FIG. 3, a microprocessor or CPU 100 according to am embodiment of the present invention is fabricated as an integrated circuit device and includes a set of data terminals 31, a set of address terminals 132 and a set of control terminals 133. These terminals 131, 132 and 133 are coupled to a system bus consisting of a data bus 60, an address bus 70 and a control bus 80. Further coupled to the system bus are a program memory 150 storing a main program and a plurality of interrupt programs, a data memory 200 for temporarily storing operand data and a plurality of peripheral units 10-1 to 10-m such as a disk controller, a display controller and so forth.

When the peripheral unit 10 requests a data processing from the CPU 100, it issues an interrupt request to change the corresponding interrupt request signal IRQ to an active level. An OR gate 300 thereby produces an active level of an interrupt-enable signal INTE. The interrupt requests IRQ are further supplied to an interrupt request control unit 250 which in turn selects one of the interrupt requests IRQ, which are issued concurrently, in accordance with a priority order provided therein and then produces interrupt level information INTL representative of the selected interrupt request. It is of course that when only one interrupt request is issued, the interrupt level information INTL corresponding thereto is produced.

The INTE signal is supplied to a terminal 111 of the CPU 100 and the interrupt level information INTL is supplied to a set of terminals 121 of the CPU 100. The CPU 100 further includes an interrupt vector generation unit 110 and an interrupt receiving control unit 120 both connected to the terminals 111 and 121. The vector generation unit 110 is activated by the active interrupt-enable signal INTE and generates interrupt vector information IV responsive to the interrupt level information. The interrupt vector information is supplied to an instruction execution unit 130. The interrupt receiving unit 120 is also activated by the active interrupt-enable signal INTE to detect whether or not an interrupt request indicative of the interrupt level information INTL is acceptable. When a mask bit of a status register (not shown) provided in the execution unit 130 stores non-mask information and the execution unit 130 is executing a program operation whose priority level is lower than that of the interrupt operation indicative of the information INTL, the unit 120 judges that the interrupt request currently selected is to be accepted and then supplies the execution unit 130 with interrupt vector fetching command information IVF. In response thereto, the execution unit 130 suspends the execution of a current program and fetches the interrupt vector information IV to initiate an interrupt program operation designated by the interrupt vector IV.

Figure 4:
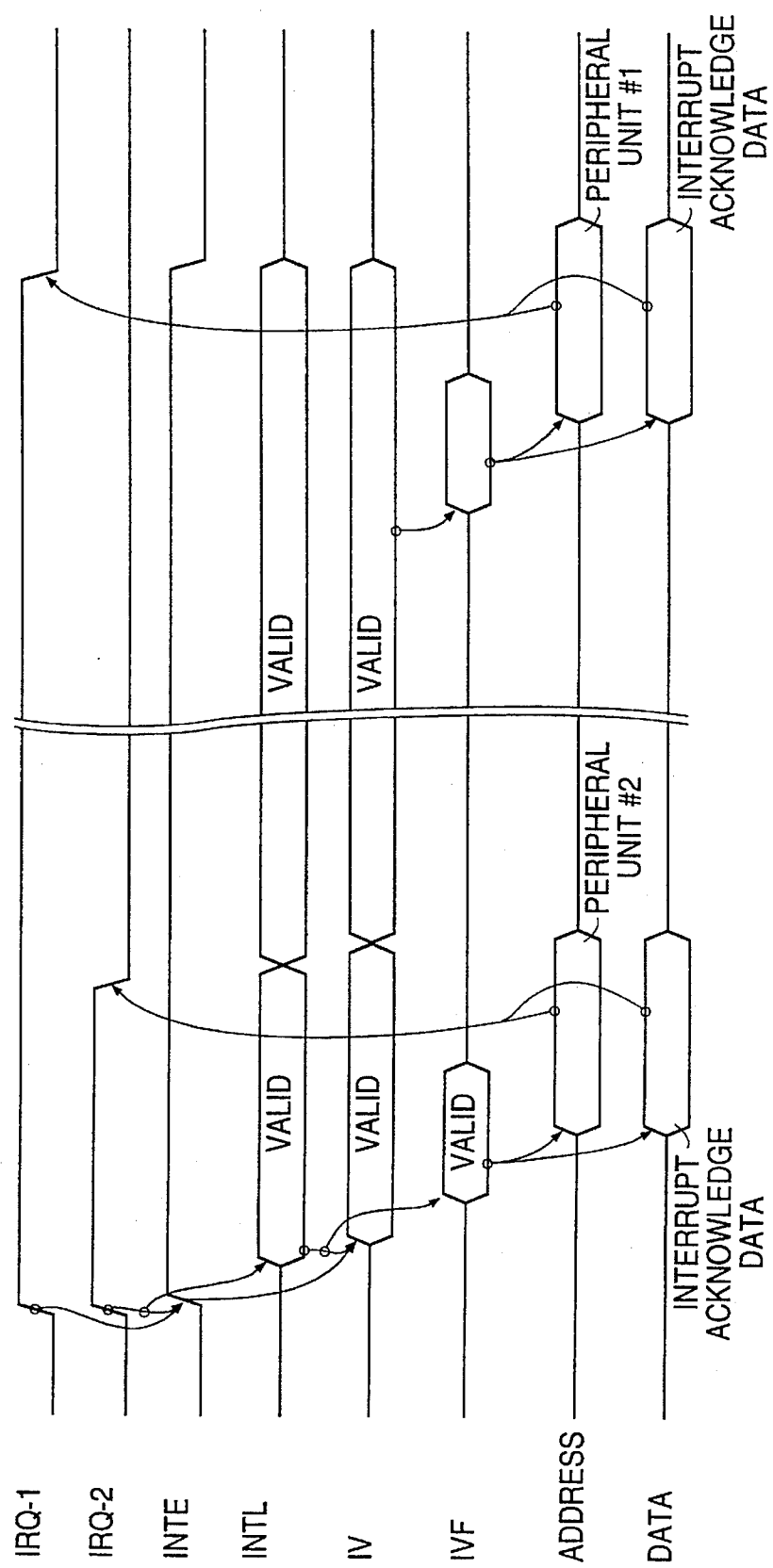
FIG. 4 is a timing chart representing operation of the system shown in FIG. 1.

Assume now that the peripheral units 10-1 and 10-2 issue an interrupt request by changing the interrupt request signals IRQ-1 and IRQ-2 to the active high level simultaneously with each other, as shown in FIG. 4. In response thereto, the interrupt-enable signal INTE is changed to the active high level through the OR gate 300. In response further thereto, the interrupt request control unit 250 produces, since the peripheral unit 10-2 has a priority order higher than the peripheral unit 10-1, the interrupt level information INTL representative of the peripheral unit 10-2, as shown in FIG. 4. The interrupt vector generation unit 110 thus generates the interrupt vector IV corresponding to an interrupt operation for the peripheral unit 10-2 irrespective of whether or not the interrupt request issued by the peripheral unit 10-2 is actually accepted by the CPU 100.

By the active level interrupt-enable signal INTE, the interrupt receiving unit 120 is also activated. Since the mask bit corresponding to the peripheral unit 10-2 represents interrupt-acceptable data and the execution unit 130 is executing the main program operation, the unit 120 produces and supplies the interrupt vector fetching command information IVF to the execution unit 130, as shown in FIG. 4. In response thereto, the execution unit 130 fetches the interrupt vector IV and suspends the execution of the main program. The execution unit 130 then initiates a bus cycle for fetching an instruction from the program memory 150 by use of the interrupt vector. That is, the CPU 100 starts accessing the memory 150 to execute the interrupt program. The interrupt program operation for the peripheral unit 10-2 is thereby initiated.

In the beginning of the interrupt program operation thus initiated, the execution unit 130 performs a bus cycle for returning interrupt acknowledge data to the peripheral unit 10-2. Namely, the unit 130 transfers onto the address bus 70 address information representative of an I/O port of the peripheral unit 10-2 and onto the data bus 60 interrupt acknowledge data, as shown in FIG. 4. The execution unit 130 advances to execute instructions in the interrupt program. On the other hand, the peripheral unit 10-2 changes the interrupt request signal IRQ-2 to the inactive low level in response to the interrupt acknowledge data supplied from the CPU 100.

Since the interrupt request by the peripheral unit 10-1 is not accepted, the unit 10-1 retains the request signal IRQ-1 at the active high level, as shown in FIG. 4. Further, since the interrupt request signal IRQ-2 is changed to the low level, the interrupt request control unit 250 produces the interrupt level IV corresponding to the peripheral unit 10-1, as also shown in FIG. 4. The interrupt vector generation unit 110 thereby generates the interrupt vector indicative of the peripheral unit 10-1. However, the interrupt operation for the peripheral unit 10-2 has the priority level higher than that for the peripheral unit 10-1, the interrupt receiving unit 120 does not produce the vector fetching command information IVF, as shorn in FIG. 4. The interrupt operation for the unit 10-1 is thereby held.

When the interrupt operation for the peripheral unit 10-2 is completed, the interrupt operation for the peripheral unit 10-1 is initiated. Of course, when another peripheral unit 10 having a priority order higher than the unit 10-1 but lower than the unit 10-2 issues its interrupt request IRQ during the interrupt operation for the unit 10-2, the interrupt operation for the unit 10-1 continues to be held. If the peripheral unit 10 having the priority order higher than the unit 10-2 issues the interrupt request, the operation for the unit 10-2 is suspended and an operation for the newly issued interrupt request is initiated. After the completion of the new interrupt operation, the operation for the unit 10-2 is resumed.

Figure 5:
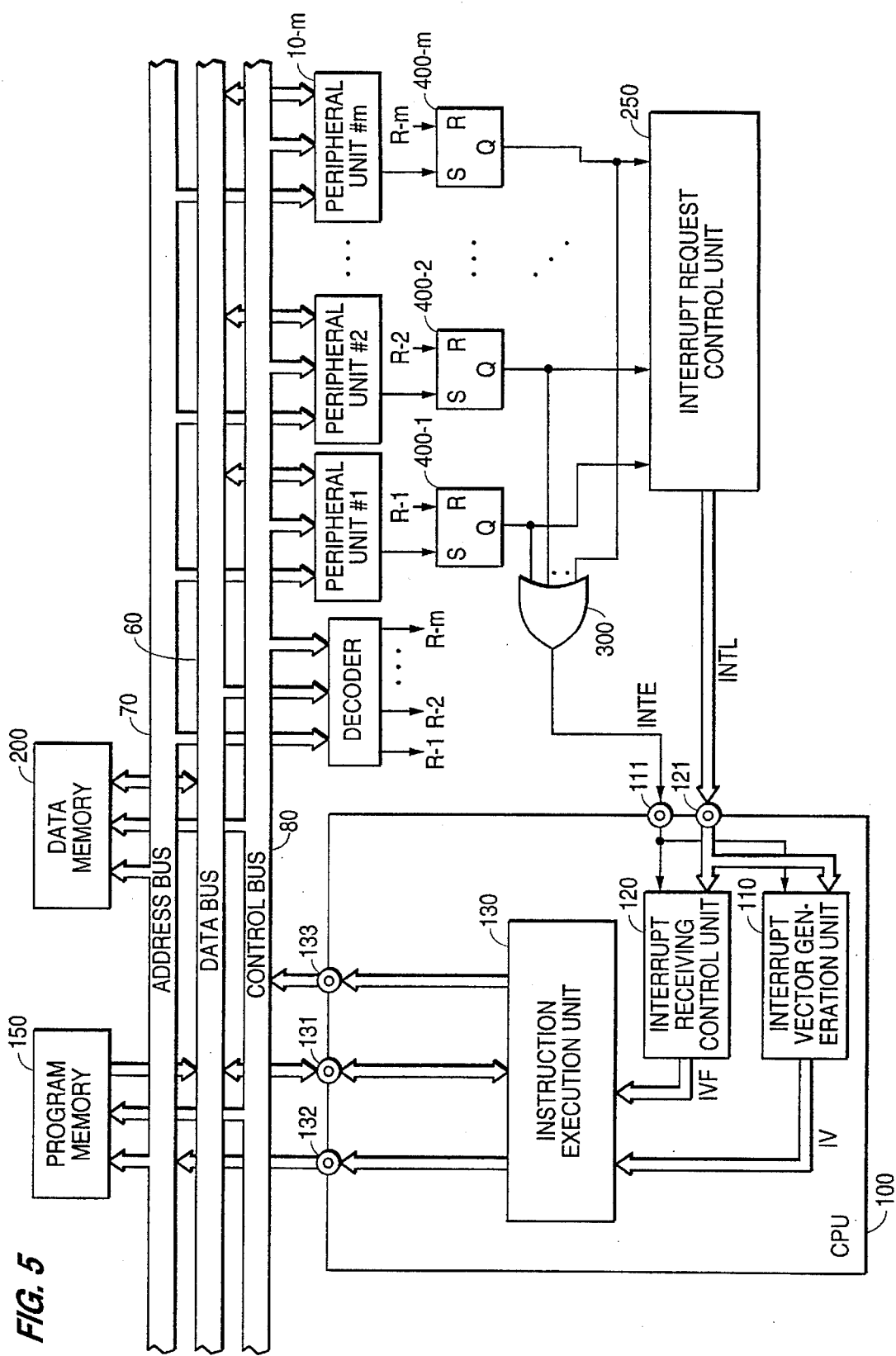
FIG. 5 is a block diagram representative of a microprocessor system according to another embodiment of the present invention.

Referring to FIG. 5, there is shown a microprocessor system according to another embodiment of the present invention in which the same constituents as those shown in FIG. 3 are denoted by the same reference numerals to omit the further description thereof. In the above embodiment, each of the peripheral unit 10 is required to hold the active level of the interrupt request signal IRQ until the CPU 100 executes the bus cycle for returning an interrupt acknowledge to the peripheral unit 10. In order to allow each peripheral unit to produce the interrupt request signal in a one-shot pulse form, the system of the present embodiment further includes flip-flop circuits 400-1 to 400-m each having a set input terminal S supplied with the corresponding one of the interrupt request signals IRQ. Further provided in this system are a decoder 500 coupled to the address and data buses 60 and 70 to detect the bus cycle for returning the interrupt acknowledge. The decoder 500, when detecting such a bus cycle, provides an active level on one of the reset signals corresponding respectively to the flip-flops 400-1 to 400-m to reset it. Thus, each of the peripheral units 10-1 to 10-m can produce the interrupt request signal IRQ in a one-shot form.

It is apparent that the present invention is not limited to the above embodiments but may be changed or modified without departing from the scope and spirit of the invention.

What is claimed is:

1. A microprocessor, comprising:

means for receiving an interrupt-enable signal representative of occurrence of an interrupt request and interrupt level information representative of an interrupt source issuing said interrupt request, means coupled to said receiving means and activated by said interrupt-enable signal for producing in response to said interrupt level information vector fetching command information when said interrupt request is acceptable, means coupled to said receiving means and activated by said interrupt-enable signal for generating interrupt vector information corresponding to said interrupt level information irrespective of whether or not said producing means produces said vector fetching command information, and means for fetching said interrupt vector information in response to said vector fetching command information and initiating an interrupt operation in response to the fetched interrupt vector information before returning interrupt acknowledge information to said interrupt source.

2. A microprocessor coupled to a plurality of peripheral units, comprising:

a first terminal supplied with an interrupt-enable signal which becomes active when at least one of said peripheral units issues an interrupt request, a set of second terminals supplied with interrupt level information representative of a selected one of the peripheral units issuing said interrupt request, an interrupt vector generation unit coupled to said first and second terminals to receive said interrupt-enable signal and said interrupt level information, said interrupt vector generation unit being activated by said interrupt-enable signal and generating, in response to said interrupt level information, interrupt vector information for designating an interrupt operation for said selected peripheral unit, an interrupt receiving unit coupled to said first and second terminals to receive said interrupt-enable signal and said interrupt level information, said interrupt receiving unit being activated by said interrupt-enable signal to detect whether or not said interrupt operation is to be accepted in response to said interrupt level information and producing interrupt vector fetching command information when said interrupt operation is detected to be accepted, and an execution unit coupled to said interrupt vector generation unit and said interrupt receiving unit for fetching said interrupt vector information in response to said interrupt vector fetching command information, said execution unit thereby initiating and performing an interrupt operation and returning interrupt acknowledge information to said selected peripheral unit as one of a plurality of operations contained in said interrupt operation.

3. The microprocessor as claimed in claim 2, wherein said microprocessor is further coupled to a memory storing an interrupt program for said interrupt operation, said execution unit accessing said memory by use of said interrupt vector information to initiate said interrupt operation and returning said interrupt acknowledge information to said selected peripheral unit by executing an instruction in said interrupt program.

4. A microprocessor system, comprising:

a microprocessor, a plurality of peripheral units, a program memory storing an interrupt program, a system bus interconnecting said microprocessor, said peripheral units and said program memory, each of said peripheral units issuing an interrupt request when requesting a data processing operation of said microprocessor, means responsive to said interrupt request for transferring interrupt request information to said microprocessor, said microprocessor including an interrupt receiving unit responding to said interrupt request information to determine whether or not said interrupt request is acceptable and generating interrupt vector fetching command information when said interrupt request is determined to be acceptable, an interrupt vector generation unit for responding to said interrupt request and generating interrupt vector information, and an execution unit for responding to said interrupt vector fetching command information to fetch said interrupt vector information and accessing said program memory to execute said interrupt program, said execution unit supplying interrupt acknowledge information through said system bus to one of said peripheral units by executing said interrupt program.

5. The microprocessor system as claimed in claim 4, wherein said one of said peripheral units withdraws said interrupt request in response to said interrupt acknowledge information.

6. The microprocessor system as claimed in claim 5, wherein said interrupt request information includes an interrupt-enable signal taking an active level when at least one of said peripheral units issues said interrupt request and interrupt level information representative of a selected one of the peripheral units issuing said interrupt request, said interrupt receiving unit being activated by said active level of said interrupt-enable signal for detecting whether or not an interrupt request is acceptable in response to said interrupt level information.

7. The microprocessor as claimed in claim 3, wherein the execution unit starts to perform the interrupt operation prior to when the execution unit starts to send the interrupt acknowledge information to said selected peripheral unit.

8. The microprocessor system as claimed in claim 4, wherein a first time when said execution unit starts performing execution of said interrupt program is prior to a second time when said execution unit starts supplying the interrupt information to said one of said peripheral units.

* * * * *